(12) United States Patent
Zhang et al.

(10) Patent No.: US 12,226,837 B2
(45) Date of Patent: Feb. 18, 2025

(54) GROOVE CUTTER WITH CHIP BREAKER

(71) Applicant: BEIJING WORLDIA DIAMOND TOOLS CO., LTD., Beijing (CN)

(72) Inventors: Zongchao Zhang, Beijing (CN); Qi Han, Beijing (CN); Shuo Han, Beijing (CN); Yanyan Wang, Beijing (CN)

(73) Assignee: BEIJING WORLDIA DIAMOND TOOLS CO., LTD., Beijing (CN)

( * ) Notice: Subject to any disclaimer, the term of this patent is extended or adjusted under 35 U.S.C. 154(b) by 497 days.

(21) Appl. No.: 17/596,953

(22) PCT Filed: Jul. 6, 2021

(86) PCT No.: PCT/CN2021/104804
§ 371 (c)(1),
(2) Date: Dec. 22, 2021

(87) PCT Pub. No.: WO2022/017176
PCT Pub. Date: Jan. 27, 2022

(65) Prior Publication Data
US 2022/0314335 A1    Oct. 6, 2022

(30) Foreign Application Priority Data

Jul. 21, 2020 (CN) .......................... 202010705641.2

(51) Int. Cl.
*B23B 27/22* (2006.01)

(52) U.S. Cl.
CPC .......... *B23B 27/22* (2013.01); *B23B 2200/32* (2013.01); *B23B 2200/321* (2013.01); *B23B 2200/328* (2013.01)

(58) Field of Classification Search
CPC ................ B23B 27/22; B23B 2200/32; B23B 2200/321; B23B 2200/328; B23B 27/045
See application file for complete search history.

(56) References Cited

U.S. PATENT DOCUMENTS 3,733,664 A    5/1973   McKelvey
4,969,779 A *  11/1990  Barten .................. B23B 27/045
                                                    407/115
(Continued)

FOREIGN PATENT DOCUMENTS

CN    1867416 A    11/2006
CN    2871070 Y    2/2007
(Continued)

OTHER PUBLICATIONS

The First Office Action from the corresponding Canadian Patent Application No. 3144031, mailed on Feb. 9, 2023.
(Continued)

*Primary Examiner* — Sara Addisu
(74) *Attorney, Agent, or Firm* — K&L Gates LLP

(57) ABSTRACT

The present invention provides a novel groove cutter with chip breaker, including: a cutter body; a cutter head arranged at the end part of the cutter body, a cutting edge being arranged at a bordering position of the cutter head; and a chip breaker arranged on the cutter head, wherein the chip breaker comprises a breaker bottom and a breaker wall, the breaker bottom being connected to the cutting edge, the breaker wall being arranged on one side of the breaker bottom away from the cutting edge, the breaker bottom being non-coplanar with the breaker wall, an intersecting line of the breaker bottom and the breaker wall including multiple connecting sections, and one curved transition section being arranged between two adjacent connecting sections. By means of the technical solutions provided in the present application, the problem that breaking chips in a groove machining process is difficult in the prior art can be solved.

17 Claims, 4 Drawing Sheets

(56) References Cited

U.S. PATENT DOCUMENTS

| | | | |
|---|---|---|---|
| 5,137,369 A | 8/1992 | Hodan | |
| 5,375,948 A | 12/1994 | Lindstedt | |
| 5,511,911 A * | 4/1996 | Katbi | B23B 27/045 407/116 |
| 5,599,141 A | 2/1997 | Katbi et al. | |
| 5,676,495 A * | 10/1997 | Katbi | B23B 27/045 407/115 |
| 5,725,334 A * | 3/1998 | Paya | B23B 27/065 407/104 |
| 7,510,355 B2 | 3/2009 | Havrda | |
| 9,925,595 B2 * | 3/2018 | Tsuda | B23B 27/045 |
| 10,569,336 B2 * | 2/2020 | Kusuda | B23B 27/007 |
| 2012/0210834 A1 | 8/2012 | Onodera | B23B 27/045 407/100 |
| 2019/0143419 A1 * | 5/2019 | Shimanuki | B23B 27/045 82/123 |
| 2021/0260669 A1 * | 8/2021 | Fukuhara | B23B 27/1611 |
| 2022/0176461 A1 * | 6/2022 | Yamamoto | B23B 27/045 |
| 2022/0314335 A1 | 10/2022 | Zhang et al. | |
| 2024/0100607 A1 * | 3/2024 | Sasaki | B23B 27/045 |

FOREIGN PATENT DOCUMENTS

| | | | |
|---|---|---|---|
| CN | 205386638 U | 7/2016 | |
| CN | 111730079 A | 10/2020 | |
| CN | 212350406 U | 1/2021 | |
| JP | S59188105 U | 12/1984 | |
| JP | H03505430 A | 11/1991 | |
| JP | H0819905 A | 1/1996 | |
| JP | 2002254216 A | 9/2002 | |
| JP | 2005288613 A * | 10/2005 | |
| JP | 2017177285 A | 10/2017 | |
| WO | WO-2016136694 A1 * | 9/2016 | B23B 27/14 |
| WO | 2022017176 A1 | 1/2022 | |

OTHER PUBLICATIONS

The First Office Action from the corresponding Japanese Patent Application No. 2022-504291, mailed on Mar. 28, 2023.

The First Office Action from the corresponding Korean Patent Application No. 10-2022-7002121, mailed on Jul. 27, 2023 (Unavailable).

The First Office Action from the corresponding Chinese Patent Application No. 202010705641.2, mailed on May 29, 2024 (Unavailable).

First Office Action from the corresponding German Patent Application No. 112021000037.3, mailed on Jul. 4, 2024 (English Translation attached).

* cited by examiner

GROOVE CUTTER WITH CHIP BREAKER

CROSS-REFERENCE TO RELATED APPLICATION

This application is a U.S. National Stage Entry under 35 U.S.C. § 371 of International Patent Application No. PCT/CN2021/104804, entitled NOVEL GROOVE CUTTER WITH CHIP BREAKER, filed Jul. 6, 2021, which claims Priority to priority Chinese patent application No. 202010705641.2, entitled "NOVEL GROOVE CUTTER WITH CHIP BREAKER", filed to the Chinese Patent Office on Jul. 21, 2020, the entire contents of which are incorporated herein by reference in their entireties.

FIELD OF THE PRESENT DISCLOSURE

The present invention relates to the technical field of cutting tools, and specifically to a novel groove cutter with chip breaker.

BACKGROUND OF THE PRESENT DISCLOSURE

Currently, cutting tools are generally used for machining workpieces. During machining, chips are removed from a workpiece while a cutting tool cuts the workpiece. If the chips come into contact with the surface of the workpiece, the chips may scratch the surface of the workpiece, resulting in the unstable surface quality of the workpiece. Further, if the chips are wound around the workpiece, corresponding processing measures are required to remove the chips from the workpiece, which increases the machining cost. Therefore, there is a problem in the prior art that it is difficult to break chips during the groove machining.

SUMMARY OF THE PRESENT DISCLOSURE

The present invention provides a novel groove cutter with chip breaker to solve the problem in the prior art that breaking chips is difficult during the groove machining process.

The present invention provides a novel groove cutter with chip breaker, comprising:
  a cutter body,
  a cutter head arranged at an end part of the cutter body, a cutting edge being arranged at a bordering position of the cutter head; and
  a chip breaker arranged on the cutter head, wherein the chip breaker comprises a breaker bottom and a breaker wall, the breaker bottom being connected to the cutting edge, the breaker wall being arranged on one side of the breaker bottom away from the cutting edge, the breaker bottom being non-coplanar with the breaker wall, an intersecting line of the breaker bottom and the breaker wall comprising multiple connecting sections, and one curved transition section being arranged between two adjacent connecting sections.

Further, the intersecting line comprises a first connecting section, a first arc section, and a second connecting section connected in sequence, the first connecting section, the first arc section, and the second connecting section being located on the same side of a central axis of the cutter head.

Further, the cutting edge comprises a left cutting edge, a right cutting edge, and a front end edge, the left cutting edge and the right cutting edge being respectively located at two sides of the cutter head; the front end edge being located at a front end of the cutter head; and the breaker bottom being connected to the front end edge.

Further, the included angle of the first connecting section and the front end edge is in the range of 20° to 60°.

Further, the included angle of the second connecting section and the front end edge is in the range of 0° to 40°.

Further, the radius of the first arc section is in the range of 0.05 mm to 1.2 mm.

Further, the shortest distance between the first arc section and the front end edge is in the range of 0.1 mm to 0.5 mm.

Further, the intersecting line further comprises a second arc section, a third connecting section, a third arc section, and a fourth connecting section connected in sequence, one end of the second arc section being connected to the second connecting section, the second connecting section and the third connecting section being respectively located at two sides of the central axis of the cutter head, and an included angle being provided between the second connecting section and the third connecting section.

Further, the chip breaker is arranged symmetrically with respect to the central axis of the cutter head.

Further, the radius of the second arc section is in the range of 0.2 mm to 1.2 mm.

Further, the shortest distance between the second arc section and the front end edge is in the range of 0.2 mm to 0.6 mm.

Further, the chip breaker has a depth dimension in the range of 0.15 mm to 0.5 mm.

Further, the breaker wall is beveled, and the included angle between the breaker wall and the central axis of the cutter head is in the range of 30° to 80°.

Further, the transition between the breaker bottom and the breaker wall is through an arc.

Further, the breaker wall is a convex arc surface or a concave arc surface.

Further, the breaker bottom is beveled, and an included angle between the breaker bottom and the central axis of the cutter head is in the range of 0° to 15°.

Further, any connecting section is a linear section or a curved section.

With the above-mentioned structure, by arranging the chip breaker on the cutter head, the chip breaker on the cutter head guides the chips and breaks the chips when the workpiece is machined by the cutting tool, thereby preventing the chips from scratching the surface of the workpiece and from being intertwined on the workpiece. Further, by arranging one curved transition section between two adjacent connecting sections, it is convenient to use the chip breaker to guide the chips, and the chip breaking effect can be improved.

DESCRIPTION OF THE EMBODIMENTS

Figure 1:
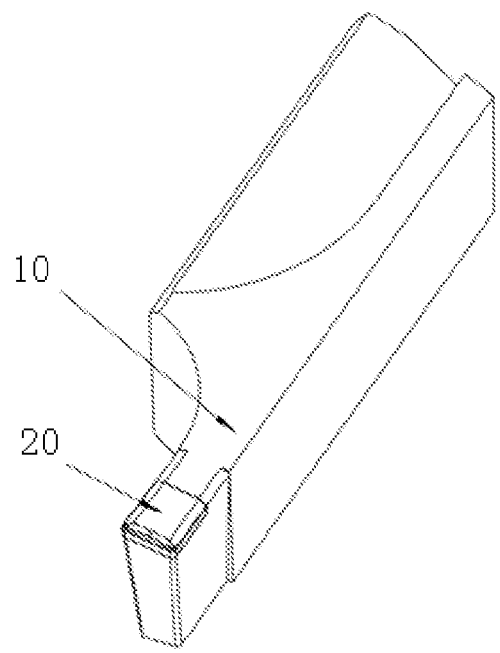
FIG. 1 shows a schematic view of a structure of a cutting tool provided according to an embodiment of the present invention.

As shown in FIGS. 1-8, embodiments of the present invention provide a novel groove cutter with chip breaker. The cutting tool includes a cutter body 10, a cutter head 20, and a chip breaker 30. The cutter head 20 is arranged at the end part of the cutter body 10, a cutting edge 21 is arranged at the bordering position of the cutter head 20, the chip breaker 30 is arranged on the cutter head 20, and the chip breaker 30 is used for guiding and breaking chips. Specifically, the chip breaker 30 includes a breaker bottom 31 and a breaker wall 32. The breaker bottom 31 and the breaker wall 32 cooperate to form a table structure. The breaker bottom 31 is connected to the cutting edge 21, and the breaker wall 32 is arranged on a side of the breaker bottom 31 away from the cutting edge 21. The breaker bottom 31 is not coplanar with the breaker wall 32, and the intersection of the breaker bottom 31 and the breaker wall 32 is an intersecting line 40. In the present embodiment, the intersecting line 40 of the breaker bottom 31 and the breaker wall 32 includes multiple connecting sections, and one curved transition section is provided between two adjacent connecting sections. Specifically, the number and positions of the connecting sections and the curved transition sections are not limited, as long as there is one curved transition section between two adjacent connecting sections. The connecting section can be a linear section or a curved section. That is, the intersecting line can be composed of multiple linear sections or multiple curved sections, or can be composed of a combination of multiple linear sections and curved sections.

With the cutting tool according to the present embodiment, by arranging the chip breaker at the cutting edge 21 of the cutter head 20, the chip breaker 30 on the cutter head 20 guides and breaks the chips when a workpiece is machined by the cutting edge 21, so as to prevent the chips from scratching the surface of the workpiece and from being intertwined on the workpiece, thereby improving the surface quality of the workpiece and simplifying the machining process. Further, by arranging one curved transition section between two adjacent connecting sections, the strength of the chip breaker can be improved. At the same time, it is convenient to use the chip breaker to guide the chips, and the chip breaking effect can be improved.

Figure 3:
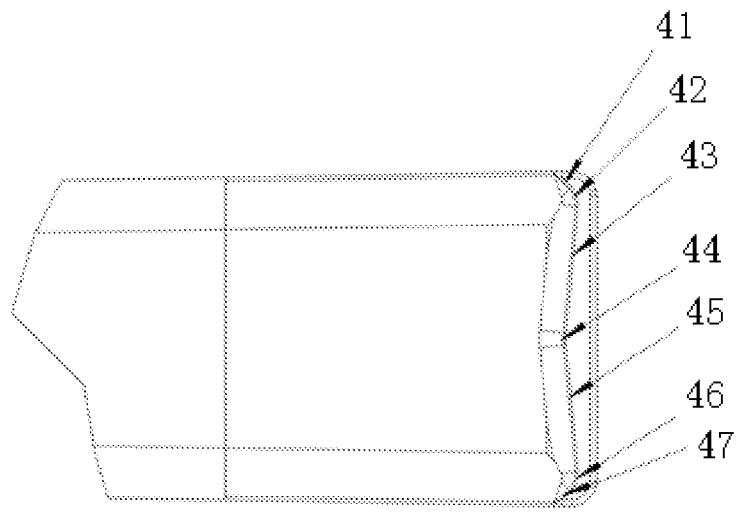
FIG. 3 shows another partially enlarged view at the cutter head of FIG. 1.

As shown in FIG. 3, the intersecting line 40 includes a first connecting section 41, a first arc section 42, and a second connecting section 43 connected in sequence. In the present embodiment, both the first connecting section 41 and the second connecting section 43 are linear sections. Specifically, the first connecting section 41, the first arc section 42, and the second connecting section 43 are located on the same side of the central axis of cutter head 20. In cutting a workpiece with the cutting edge 21 on one side of the cutter head 20, chips can move from the breaker bottom 31 to the breaker wall 32 via the first connecting section 41 or the first arc section 42 or the second connecting section 43 to achieve the guiding and chip breaking effect.

In this embodiment, the cutting edge 21 comprises a left cutting edge 211, a right cutting edge 212, and a front end edge 213. The left cutting edge 211 and the right cutting edge 212 are respectively located at two sides of the cutter head 20, and the front end edge 213 is located at the front end of the cutter head 20. The chip breaker 30 is located behind the front end edge 213. Specifically, the breaker bottom 31 is connected to the front end edge 213 so that chips can move from the front end edge 213 to the breaker bottom 31 and the breaker wall 32 when the workpiece is cut with the front end edge 213. In other embodiments, a chip breaker 30 can be arranged at the left cutting edge 211 and/or the right cutting edge 212 depending on the type of the cutting tool, so as to meet various cutting requirements.

Figure 4:
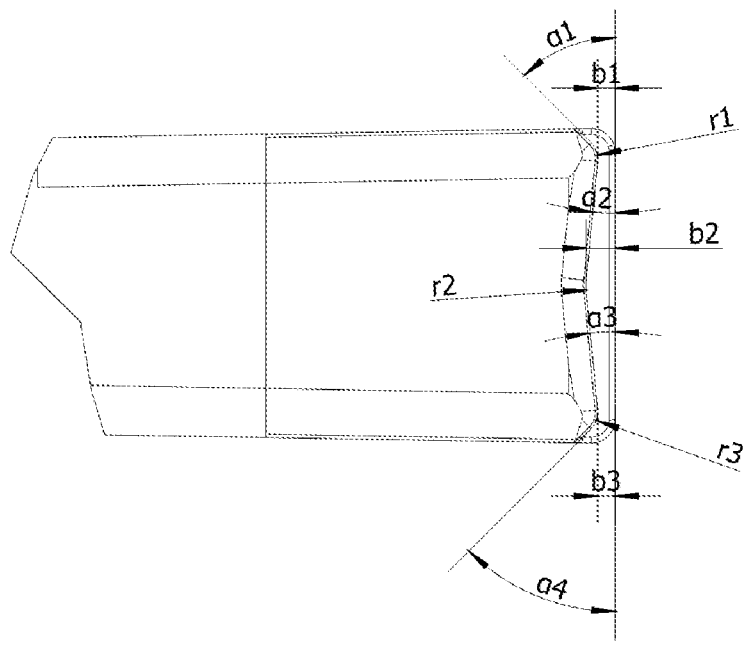
FIG. 4 shows a dimensional view of an intersecting line of FIG. 2.

As shown in FIG. 4, the included angle α1 of the first connecting section 41 and the front end edge 213 is in the range of 20° to 60°. If the included angle α1 between the first connecting section 41 and the front end edge 213 is set within the above-mentioned range, the first connecting section 41 has a good guiding effect when the chips move from the breaker bottom 31 to the breaker wall 32. If the included angle α1 is less than 20° or more than 60°, the chips are easy to offset, and the chip breaking effect cannot be ensured. In this embodiment, the included angle α1 is 45°. In other embodiments, the included angle α1 can be 30°, 40°, or 50°.

Specifically, the included angle α2 of the second connecting section 43 and the front end edge 213 is in the range of 0° to 40°. If the included angle α2 between the second connecting section 43 and the front end edge 213 is set within the above-mentioned range, the second connecting section 43 can have a good guiding effect on the chips, which is similar to the effect of the included angle α1. Similarly, if α2 is greater than 40°, the chips are easy to offset and the chip breaking effect cannot be ensured. In this embodiment, the included angle α2 is in the range of 6° to 10°. Specifically, the included angle α2 can be 6°, 7°, 8°, 9° or 10°.

As shown in FIG. 4, the radius r1 of the first arc section 42 is between 0.05 mm and 1.2 mm. Since the first arc section 42 is located between the first connecting section 41 and the second connecting section 43, one end of the first arc section 42 is connected to the first connecting section 41, and the other end of the first arc section 42 is connected to the second connecting section 43. If the radius r1 of the first arc section 42 is set within the above-mentioned range, it can ensure that the first connecting section 41 and the second connecting section 43 smoothly transition through the first arc section 42, and can also ensure that the chips move along a predetermined path such that the chip breaking effect can be improved. In this embodiment, the radius r1 can be any one of 0.1 mm, 0.2 mm, 0.3 mm, 0.4 mm, 0.5 mm, 0.6 mm, 0.7 mm, 0.8 mm, 0.9 mm, 1 mm, and 1.1 mm.

The shortest distance b1 between the first arc section 42 and the front end edge 213 is in the range of 0.1 mm to 0.5 mm. Specially, the shortest distance b1 between the first arc section 42 and the front end edge 213 is the distance between the rightmost tangent point of the first arc section 42 and the front end edge 213. By setting the shortest distance b1 between the first arc section 42 and the front end edge 213 within the above-mentioned range, the chip breaking effect can be ensured. In this embodiment, b1 is 0.2 mm. In other embodiments, b1 can be 0.3 mm and 0.4 mm.

As shown in FIGS. 3 and 4, the intersecting line 40 further comprises a second arc section 44, a third connecting section 45, a third arc section 46, and a fourth connecting section 47 connected in sequence. One end of the second arc section 44 is connected to the second connecting section 43. The second connecting section 43 and the third connecting section 45 are respectively located on two sides of the central axis of the cutter head 20, and the second connecting section 43 and the third connecting section 45 have an included angle therebetween. By arranging the second arc section 44 between the second connecting section 43 and the third connecting section 45, the smooth transition between the second connecting section 43 and the third connecting section 45 can be ensured, and the strength of the connection of the chip breakers can be enhanced, so as to avoid chip accumulation at the connection between the second connecting section 43 and the third connecting section 45.

It should be noted that in some embodiments, the intersecting lines located on two sides of the second arc section 44 can be asymmetrical, thereby allowing the two sides of the cutting tool to respectively meet different cutting requirements, which broadens the cutting tool's range of application. At the same time, it is also possible to arrange the chip breaker 30 symmetrically with respect to the central axis of the cutter head 20. By arranging the chip breaker 30 symmetrically with respect to the central axis of the cutter head 20, it is possible to ensure that the chip breaking performance on both sides of the cutting tool is the same when the cutting tool is used for machining a workpiece, thereby facilitating machining.

Specifically, the included angle $\alpha 3$ of the third connecting section 45 and the front end edge 213 is in the range of 0° to 40°. If the included angle $\alpha 3$ between the third connecting section 45 and the front end edge 213 is set within the above-mentioned range, the third connecting section 45 can have a good guiding effect on the chips. Similarly, if $\alpha 3$ is greater than 40°, the chips are easy to offset and the chip breaking effect cannot be ensured. In this embodiment, the included angle $\alpha 3$ is in the range of 6° to 10°. Specifically, the included angle $\alpha 3$ can be 6°, 7°, 8°, 9°, or 10°.

Specifically, the radius r3 of the third arc section 46 is between 0.05 mm and 1.2 mm. Since the third arc section 46 is located between the third connecting section 45 and the fourth connecting section 47, the radius r3 of the third arc section 46 is set within the above-mentioned range, so that it can ensure that the third connecting section 45 and the fourth connecting section 47 smoothly transition through the third arc section 46, and can ensure that the chips move along a predetermined path, which can improve the chip breaking effect. In this embodiment, the radius r1 can be any one of 0.1 mm, 0.2 mm, 0.3 mm, 0.4 mm, 0.5 mm, 0.6 mm, 0.7 mm, 0.8 mm, 0.9 mm, 1 mm, and 1.1 mm.

The shortest distance b3 between the third arc section 46 and the front end edge 213 is in the range of 0.1 mm and 0.5 mm. Specifically, the shortest distance b3 between the third arc section 46 and the front end edge 213 is the distance between the rightmost tangent point of the third arc section 46 and the front end edge 213. By setting the shortest distance b3 between the third arc section 46 and the front end edge 213 within the above-mentioned range, the chip breaking effect can be ensured. In the present embodiment, b3 is 0.2 mm. In other embodiments, b3 can be 0.3 mm or 0.4 mm.

Specifically, the included angle $\alpha 4$ of the fourth connecting section 47 and the front end edge 213 is in the range of 20° to 60°. If the included angle $\alpha 4$ between the fourth connecting section 47 and the front end edge 213 is set within the above-mentioned range, the fourth connecting section 47 can have a good guiding effect when the chips move from the breaker bottom 31 to the breaker wall 32. If the included angle $\alpha 4$ is less than 20° or more than 60°, the chips are easy to offset, and the chip breaking effect cannot be ensured. In this embodiment, the included angle $\alpha 4$ is 45°. In other embodiments, the included angle $\alpha 4$ can be 30°, 40°, or 50°.

As shown in FIG. 4, the radius r2 of the second arc section 44 is between 0.2 mm and 1.2 mm. By setting the radius r2 of the second arc section 44 within the above-mentioned range, it is possible to ensure the smooth transition between the second connecting section 43 and the third connecting section 45 and to facilitate machining. If the radius r2 of the second arc section 44 is less than 0.2 mm, the second arc section 44 is not convenient to be machined, and the machining cost is high; if the radius r2 of the second arc section 44 is more than 1.2 mm, the chip breaking effect cannot be ensured. In this embodiment, the radius r1 can be any one of 0.3 mm, 0.4 mm, 0.5 mm, 0.6 mm, 0.7 mm, 0.8 mm, 0.9 mm, 1 mm, and 1.1 mm.

In this embodiment, the shortest distance b2 between the second arc section 44 and the front end edge 213 is in the range of 0.2 mm to 0.6 mm. By setting the shortest distance b2 between the second arc section 44 and the front end edge 213 within the above-mentioned range, the chip breaking effect can be ensured. In this embodiment, b2 is 0.3 mm. In other embodiments, b2 can be 0.4 mm or 0.5 mm.

Figure 5:
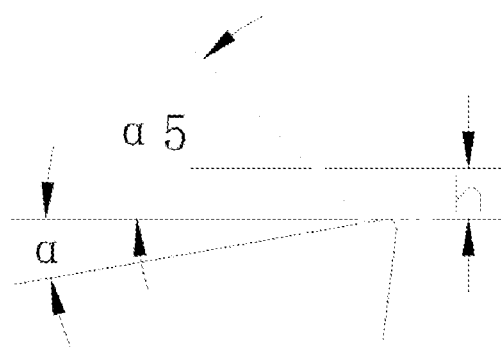
FIG. 5 shows a dimensional view of a chip breaker of FIG. 2.
Figure 6:
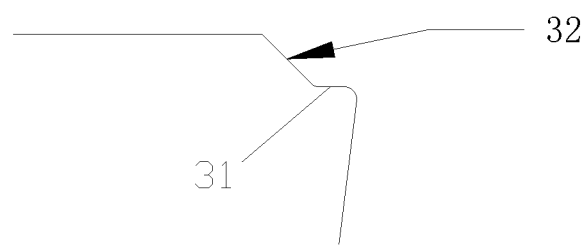
FIG. 6 shows a schematic view of a structure where a breaker wall of a cutting tool provided by an embodiment of the present invention is beveled.

As shown in FIG. 5, the chip breaker 30 has a depth dimension h in the range of 0.15 mm to 0.5 mm. In this embodiment, the chip breaker 30 has a depth dimension h which is the height difference between the top of the breaker bottom 31 and the top of the breaker wall 32. In this embodiment, the chip breaker 30 has a depth dimension h of 0.25 mm. The depth dimension h of the chip breaker 30 can also be 0.2 mm, 0.3 mm, or 0.4 mm.

In this embodiment, the breaker wall 32 can be beveled, and the included angle $\alpha 5$ between the breaker wall 32 and the central axis of the cutter head 20 is in the range of 30° to 80°, which facilitates the chips moving from the breaker bottom 31 to the breaker wall 32 and breaking into chips. Specifically, the included angle $\alpha 5$ between the breaker wall 32 and the central axis of the cutter head 20 is 45°.

Specifically, in this embodiment, the transition between the breaker bottom 31 and the breaker wall 32 is through an arc, which further facilitates the chips moving from the breaker bottom 31 to the breaker wall 32 and breaking into chips, and prevents the occurrence of chip accumulation.

In this embodiment, the breaker bottom 31 is beveled, and the included angle $\alpha$ between the breaker bottom 31 and the central axis of the cutter head 20 is in the range of 0° to 15°. By setting the breaker bottom 31 to be beveled and setting the included angle $\alpha$ between the breaker bottom 31 and the central axis of the cutter head 20 within the above-mentioned range, the chips are facilitated moving from the cutting edge 21 to the breaker bottom 31 when the workpiece is cut by the cutting edge 21. When a is 0°, the strength of the cutter head is higher, and the acting force is greater when the breaker bottom is in contact with the chips, which is beneficial to the bending deformation of the chips. When a is greater than 0°, the breaker bottom can conform to the bent chips to make it smoothly transition, which is beneficial to chip guiding so that the chips move to the breaker wall. At this time, due to the effect of the breaker wall, the angle for changing the chip motion direction increases, and it is easier to break the chips. The angle $\alpha$ should not be too large, otherwise it may easily lead to a decrease in the strength of the cutter tip.

Figure 2:
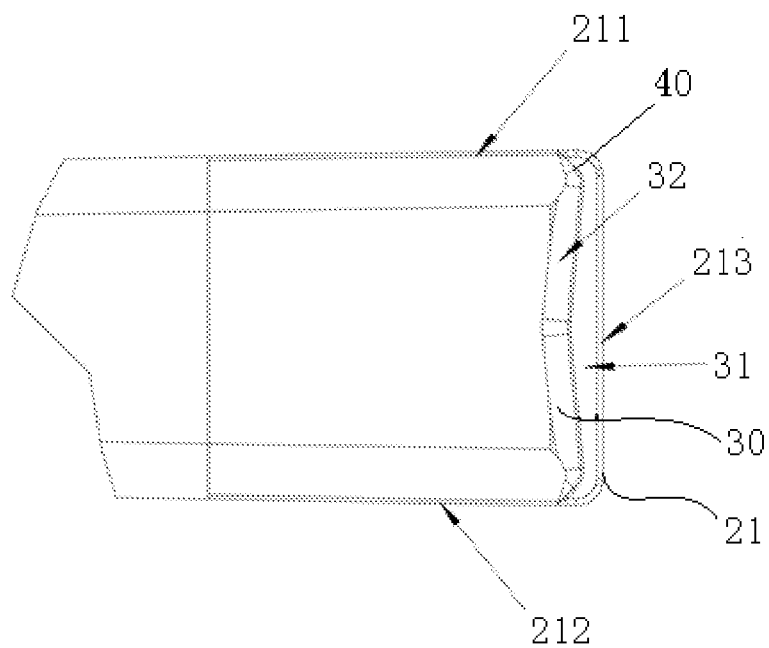
FIG. 2 shows a partially enlarged view at a cutter head of FIG. 1.

As shown in FIG. 2, both the transition between the left cutting edge 211 and the front end edge 213 and the transition between the right cutting edge 212 and the front end edge 213 are smooth. Specifically, the cutter edge between the left cutting edge 211 and the front end edge 213 is a first arc cutter edge, and the cutter edge between the right cutting edge 212 and the front end edge 213 is a second arc cutter edge.

In this embodiment, the chip breaker is machined by laser engraving.

The edge parameters of the groove cutter can be designed as a sharp edge, a passivated edge, or a chamfered edge.

In this embodiment, the form of the cutter body 10 is not limited, and the cutter head 20 is welded to the cutter body 10. Specifically, the cutter head 20 may have a quadrilateral shape as shown in the figures, or other shapes.

Figure 7:
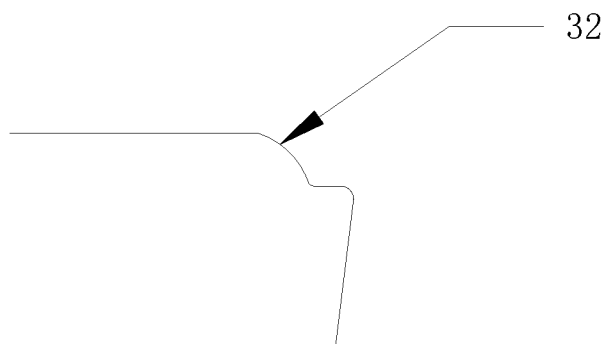
FIG. 7 shows a schematic view of a structure where a breaker wall of a cutting tool provided by an embodiment of the present invention is a convex arc surface.
Figure 8:
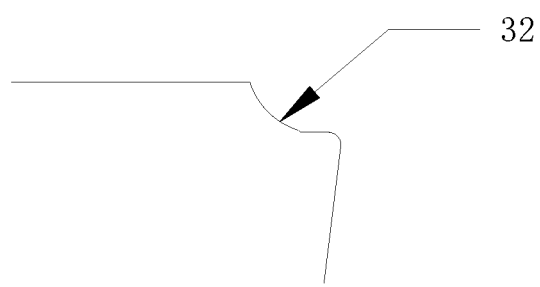
FIG. 8 shows a schematic view of a structure where a breaker wall of a cutting tool provided by an embodiment of the present invention is a concave arc surface.

As shown in FIGS. 7 and 8, another embodiment of the present invention provides a cutting tool that differs from the embodiments described above in that the breaker wall 32 is arranged as a convex arc surface or a concave arc surface in this embodiment.

With the groove cutter provided in this embodiment, a chip breaker is arranged at the cutting edge 21 of the cutter head 20, and one curved transition section is arranged between two adjacent connecting sections, so that it is possible to prevent chips from scratching the surface of the workpiece or from being intertwined on the workpiece, thereby improving the surface quality of the workpiece, simplifying the machining process, and further improving the chip breaking effect.

Finally, it should be noted that the above embodiments are merely illustrative of the technical solution of the present invention, and are not restrictive thereto; although the present invention has been described in detail with reference to the foregoing embodiments, those of ordinary skills in the art should understand that, the technical solutions disclosed in the above-mentioned embodiments can still be modified, or some of the technical features thereof can be replaced by equivalents. Such modifications and substitutions do not cause the essence of the corresponding technical solutions to depart from the spirit and scope of the technical solutions of various embodiments of the present invention.

What is claimed is:

1. A groove cutter with chip breaker, comprising:
   a cutter body (10);
   a cutter head (20) arranged at an end part of the cutter body (10), a cutting edge (21) being arranged at a bordering position of the cutter head (20); and
   a chip breaker (30) arranged on the cutter head (20), wherein the chip breaker (30) comprises a breaker bottom (31) and a breaker wall (32), the breaker bottom (31) being connected to the cutting edge (21), the breaker wall (32) being arranged on one side of the breaker bottom (31) away from the cutting edge (21), the breaker bottom (31) being non-coplanar with the breaker wall (32), an intersecting line (40) of the breaker bottom (31) and the breaker wall (32) comprising multiple connecting sections, and one curved transition section being arranged between two adjacent connecting sections,
   wherein the intersecting line (40) of the breaker bottom (31) and the breaker wall (32) extends from a left cutting edge (211) of cutter head (20) to a right cutting edge (212) of cutter head (20),
   wherein a left end of the intersecting line (40) intersects with and touches the left cutting edge (211), and a right end of the intersecting line (40) intersects with and touches the right cutting edge (212).

2. The groove cutter with chip breaker of claim 1, wherein the intersecting line (40) comprises a first connecting section (41), a first arc section (42) and a second connecting section (43) connected in sequence, the first connecting section (41), the first arc section (42) and the second connecting section (43) being located on the same side of a central axis of the cutter head (20).

3. The groove cutter with chip breaker of claim 2, wherein the cutting edge (21) comprises a left cutting edge (211), a right cutting edge (212) and a front end edge (213), the left cutting edge (211) and the right cutting edge (212) being respectively located at two sides of the cutter head (20), the front end edge (213) being located at a front end of the cutter head (20), and the breaker bottom (31) being connected to the front end edge (213).

4. The groove cutter with chip breaker of claim 3, wherein an included angle between the first connecting section (41) and the front end edge (213) is in the range of 20° to 60°.

5. The groove cutter with chip breaker of claim 3, wherein an included angle between the second connecting section (43) and the front end edge (213) is in the range of 0° to 40°.

6. The groove cutter with chip breaker of claim 3, wherein a radius of the first arc section (42) is in the range of 0.05 mm to 1.2 mm.

7. The groove cutter with chip breaker of claim 3, wherein a shortest distance between the first arc section (42) and the front end edge (213) is in the range of 0.1 mm to 0.5 mm.

8. The groove cutter with chip breaker of claim 3, wherein the intersecting line (40) further comprises a second arc section (44), a third connecting section (45), a third arc section (46) and a fourth connecting section (47) connected in sequence, one end of the second arc section (44) being connected to the second connecting section (43), the second connecting section (43) and the third connecting section (45) being respectively located at two sides of the central axis of the cutter head (20), and an included angle being provided between the second connecting section (43) and the third connecting section (45).

9. The groove cutter with chip breaker of claim 8, wherein the chip breaker (30) is arranged symmetrically with respect to the central axis of the cutter head (20).

10. The groove cutter with chip breaker of claim 8, wherein the radius of the second arc section (44) is in the range of 0.2 mm to 1.2 mm.

11. The groove cutter with chip breaker of claim 8, wherein a shortest distance between the second arc section (44) and the front end edge (213) is in the range of 0.2 mm to 0.6 mm.

12. The groove cutter with chip breaker of claim 1, wherein a depth dimension of the chip breaker (30) is in the range of 0.15 mm to 0.5 mm.

13. The groove cutter with chip breaker of claim 1, wherein the breaker wall (32) is beveled, and an included angle between the breaker wall (32) and the central axis of the cutter head (20) is in the range of 30° to 80°.

14. The groove cutter with chip breaker of claim 13, wherein a transition between the breaker bottom (31) and the breaker wall (32) is through an arc.

15. The groove cutter with chip breaker of claim 1, wherein the breaker wall (32) is a convex arc surface or a concave arc surface.

16. The groove cutter with chip breaker of claim 1, wherein the breaker bottom (31) is beveled, and an included angle between the breaker bottom (31) and the central axis of the cutter head (20) is in the range of 0° to 15°.

17. The groove cutter with chip breaker of claim 1, wherein any connecting section is a linear section or a curved section.

* * * * *